United States Patent
Richardson

(10) Patent No.: US 10,276,212 B2
(45) Date of Patent: Apr. 30, 2019

(54) MARKING STORED VIDEO

(71) Applicant: Lytx, Inc., San Diego, CA (US)

(72) Inventor: Larry Richardson, San Diego, CA (US)

(73) Assignee: Lytx, Inc., San Diego, CA (US)

(*) Notice: Subject to any disclaimer, the term of this patent is extended or adjusted under 35 U.S.C. 154(b) by 23 days.

(21) Appl. No.: 15/474,521

(22) Filed: Mar. 30, 2017

(65) Prior Publication Data
US 2017/0263289 A1 Sep. 14, 2017

Related U.S. Application Data

(63) Continuation of application No. 14/329,830, filed on Jul. 11, 2014, now Pat. No. 9,646,651.

(51) Int. Cl.
*H04N 5/91* (2006.01)
*G11B 27/10* (2006.01)
*G11B 27/28* (2006.01)

(52) U.S. Cl.
CPC ............ *G11B 27/10* (2013.01); *H04N 5/91* (2013.01); *G11B 27/28* (2013.01)

(58) Field of Classification Search
CPC .......... G11B 27/10; G11B 27/28; H04N 5/91
See application file for complete search history.

(56) References Cited

U.S. PATENT DOCUMENTS

| | | | |
|---|---|---|---|
| 7,149,359 B1 | 12/2006 | Omoigui | |
| 9,728,228 B2* | 8/2017 | Palmer | G11B 27/105 |
| 2002/0107912 A1 | 8/2002 | Chutorash | |
| 2002/0163577 A1 | 11/2002 | Myers | |
| 2003/0058340 A1 | 3/2003 | Lin | |
| 2003/0065409 A1 | 4/2003 | Raeth | |
| 2003/0080878 A1 | 5/2003 | Kirmuss | |
| 2004/0027365 A1 | 2/2004 | Sayers | |
| 2004/0187160 A1 | 9/2004 | Cook | |
| 2005/0099498 A1* | 5/2005 | Lao | H04N 5/765 |
| | | | 348/207.99 |
| 2005/0108775 A1 | 5/2005 | Bachar | |
| 2007/0113261 A1 | 5/2007 | Roman | |
| 2007/0115097 A1 | 5/2007 | Scott | |
| 2008/0068461 A1 | 3/2008 | Izakov | |
| 2011/0085778 A1* | 4/2011 | Iwase | G11B 27/034 |
| | | | 386/228 |
| 2011/0173235 A1 | 7/2011 | Aman | |
| 2013/0006718 A1 | 1/2013 | Nielsen | |
| 2013/0332603 A1 | 12/2013 | Hutten | |
| 2014/0089375 A1 | 3/2014 | Poornachandran | |

* cited by examiner

*Primary Examiner* — Nicholas Kiswanto
(74) *Attorney, Agent, or Firm* — Van Pelt, Yi & James LLP

(57) ABSTRACT

A system for marking video comprises an input interface, a processor, and an output interface. The input interface is configured to receive event recorder data from an event data recorder and to receive an indication of an event of interest. The processor is configured to determine a start mark and an end mark for the event of interest. The output interface configured to provide the start mark and the end mark to a continuous video recorder of the vehicle.

18 Claims, 7 Drawing Sheets

MARKING STORED VIDEO

CROSS REFERENCE TO OTHER APPLICATIONS

This application is a continuation of co-pending U.S. patent application Ser. No. 14/329,830, entitled MARKING STORED VIDEO filed Jul. 11, 2014 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. A vehicle event recorder can additionally include a continuous video recorder (e.g., a video recorder storing video at all times the vehicle is in operation), an audio recorder, or recorder for other event data collected. Storing video from all times a vehicle is in operation can ensure that events of interest are captured, however, the events of interest can be difficult to locate within the entirety of the recorded video.

BRIEF DESCRIPTION OF THE DRAWINGS

Various embodiments of the invention are disclosed in the following detailed description and the accompanying drawings.

DETAILED DESCRIPTION

Figure 1:
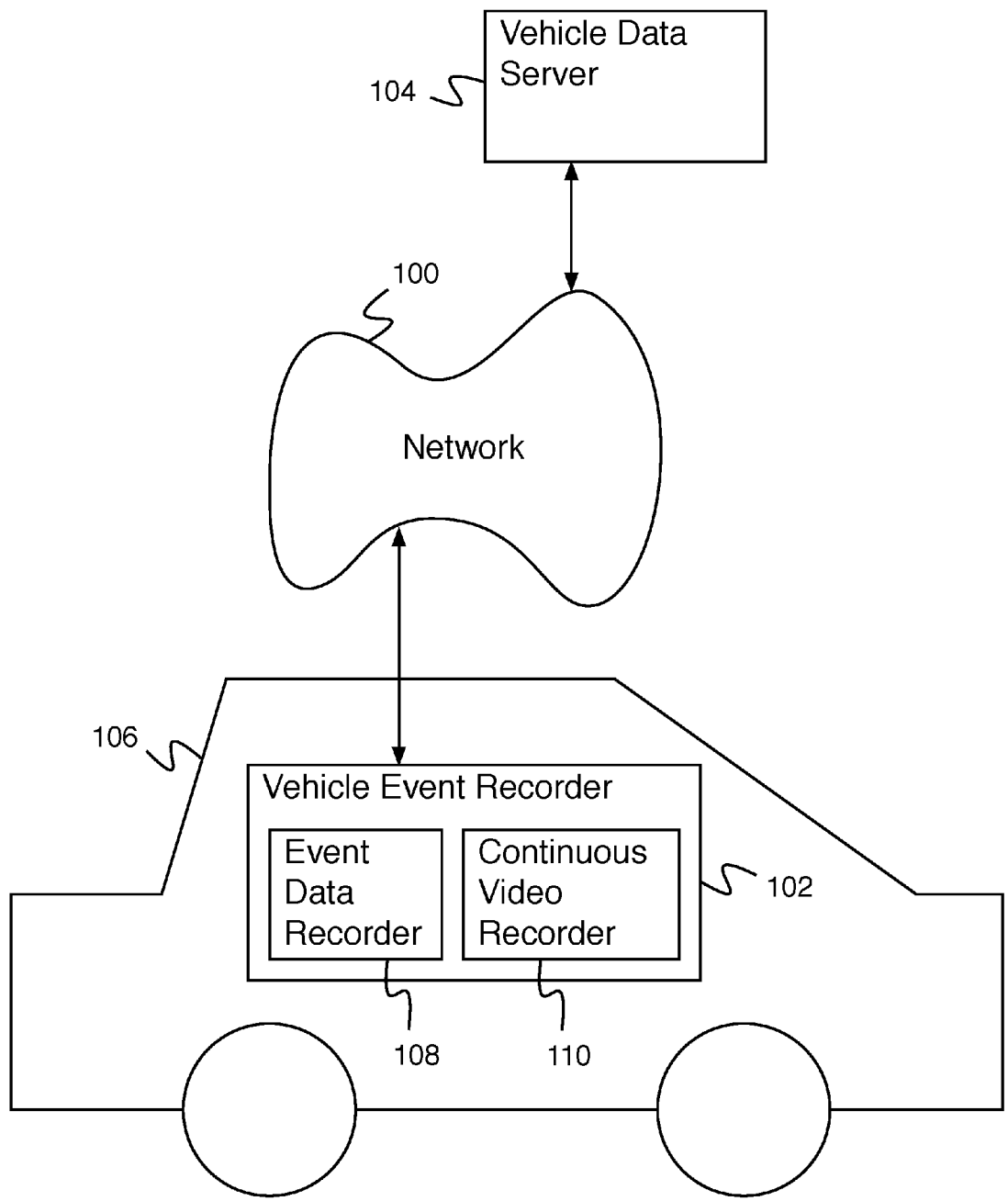
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for marking video is disclosed. The system for marking video comprises an input interface configured to receive event recorder data from a vehicle and receive an indication of an event of interest. The system for marking video additionally comprises a processor configured to determine a start mark and an end mark for the event of interest, and an output interface configured to provide the start mark and the end mark to a continuous video recorder of the vehicle. The system for marking video additionally comprises a memory coupled to the processor and configured to provide the processor with instructions.

In some embodiments, a system for marking video is used in a network system including a vehicle event recorder. The vehicle event recorder comprises a set of sensors (e.g., audio and video recorders, global positioning system sensors, accelerometers, gyroscopes, etc.) for determining a vehicle state, and a device for recording the sensor data. The vehicle event recorder additionally comprises a continuous video recorder for continuously recording video data. In some embodiments, when an event of interest occurs (e.g., as detected by the vehicle event recorder or indicated by a system administrator), it is desirable to identify a region of video from the continuous video recorder associated with the event of interest. The region of video from the continuous video recorder is then downloaded for viewing or identified for preservation and later downloading. In some embodiments, an indication of an event of interest received from a system administrator comprises an approximate target time and a target time range (e.g., "it happened at about 10 AM, give or take half an hour."). The system for marking video determines a start mark and an end mark based on event recorder data and on the indication of the event of interest. Regions within the event recorder data including any deviations from a baseline are identified and used to determine a video region to identify. In various embodiments, the event recorder data deviation nearest the target time is used to identify the video region, a region including the two event recorder data deviations nearest the target time is used to identify the video region, a region including all data deviations within the target time range is used to identify the video region, a buffer time is added to the identified video region, or the video region is identified in any other appropriate way.

In various embodiments, the event data recorder and the continuous video recorder are separate units (e.g., physically separated), the event data recorder and the continuous video recorder are part of the same unit (e.g., physically housed in the same shell), or any other appropriate configuration of event data recorder and continuous video recorder.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 comprises a system for detecting risky behavior. In some embodiments, vehicle event recorder 102 comprises a system for marking stored video. Vehicle event recorder 102 comprises event data recorder 108 and continuous video recorder 110. In some embodiments, vehicle event recorder 102 comprises event detector and event data recorder 108 and continuous video recorder 110 is a separate unit (e.g., physically separate from vehicle event recorder 102). In some embodiments, event data recorder 108 includes or is in communication with a set of sensors—for example, video recorders, audio recorders, accelerometers, gyroscopes, global positioning system (GPS) sensors, vehicle state sensors, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, event data recorder 108 comprises a system for processing sensor data and detecting events. In some embodiments, event data recorder 108 compares sensor data to a threshold and determines that an event has occurred if the sensor data has crossed the threshold. In some embodiments, event data recorder 108 stores detected events, wherein events are detected based on an event profile (e.g., the profile comprises a set of conditions that need to be satisfied for the event to be identified). In various embodiments, in the event that event data recorder 108 determines an event has occurred, event data recorder 108 stores an event indication, stores a video segment, stores sensor data, transmits an event indication, or performs any other appropriate action. In some embodiments, event data recorder 108 stores sensor data regardless of whether an event has been detected. Continuous video recorder 110 comprises a continuous video recorder for continuously recording video data. In some embodiments, continuous video recorder receives and continuously records video data. In some embodiments, continuous video recorder 110 comprises data storage for recording video data. In some embodiments, continuous video recorder 110 comprises a limited amount of data storage for recording video data (e.g., enough storage to record video data for one day, three days, one week, one month, etc.). In some embodiments, when continuous video recorder 110 is full (e.g., video has been recorded to its entire data storage), new video data overwrites the oldest stored video data. In some embodiments, video stored on continuous video recorder 110 can be downloaded (e.g., to vehicle data server 104). In some embodiments, video stored on continuous video recorder 110 can be marked for preservation (e.g., marked to indicate that it should not be overwritten even if it is the oldest video data stored on continuous video recorder 110). In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106.

In some embodiments, vehicle event recorder 102 includes a communications system for communicating with network 100. In various embodiments, network 100 comprises a wireless network, a wired network, a cellular network, a CDMA network, a GSM network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In various embodiments, vehicle data server 104 comprises a video data server for receiving or for requesting events stored by event data recorder 108 or video stored by continuous video recorder 110. In some embodiments, vehicle data server 104 comprises a vehicle data server for marking video stored on continuous video recorder 110 for preservation.

In some embodiments, a system user or administrator accessing vehicle event recorder 102 (e.g., either directly or via vehicle data server 104) provides an indication of an event of interest. In some embodiments, an indication of an event of interest comprises a target time (e.g., the approximate time the system user or administrator believes the event occurred). In some embodiments, an indication of an event of interest comprises a target time range (e.g., a time range around the target time the system user or administrator believes the event occurred within). The vehicle event recorder makes a determination of a time range of continuous video data to preserve (e.g., download, mark to not overwrite, etc.). In some embodiments, the determined continuous video data is provided to the system user or administrator. In some embodiments, the determined continuous video data is preserved for later download. In various embodiments, an indication of an event of interest comprises an indication received from a system user or administrator, an event determined by vehicle event recorder 102, a maneuver determined by vehicle event recorder 102, or any other appropriate indication of an event of interest.

Figure 2A:
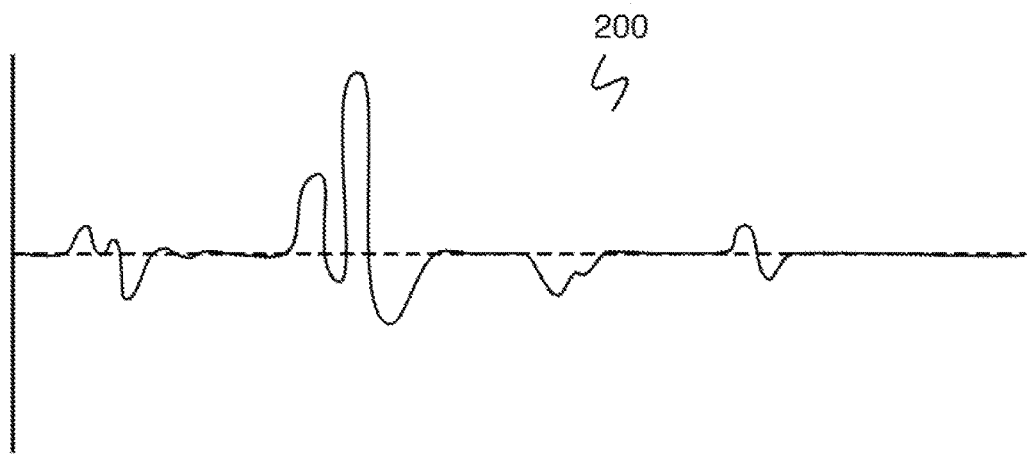
FIG. 2A is a diagram illustrating an embodiment of event recorder data.

FIG. 2A is a diagram illustrating an embodiment of event recorder data. In some embodiments, event recorder data 200 comprises event recorder data recorded by an event data recorder (e.g., event data recorder 108 of FIG. 1). In various embodiments, event recorder data 200 comprises data from a video recorder (e.g., motion data extracted from video), data from an audio recorder (e.g., audio envelope data), event data, sensor data, accelerometer data, gyroscope data, data from GPS, accelerator data, braking data, engine data, temperature data, moisture data, line tracker data, driving maneuver data (e.g., driving maneuvers determined from a set of sensor data events, for example, accelerometer data received over a period of time), or any other appropriate data. In some embodiments, event recorder data 200 comprises event recorder data received by a vehicle data server from a vehicle event recorder. In some embodiments, event recorder data 200 comprises data events that are large enough to cause an event to be triggered (e.g., deviations from a sensor data norm that are larger than a threshold or that match a pattern or profile). In some embodiments, event recorder data 200 comprises data events that are not large enough to cause an event to be triggered (e.g., deviations from a sensor data norm that are not larger than a threshold). In some embodiments, event recorder data 200 comprises data norm measurements (e.g., periods of time when there are no deviations and a data norm can be measured).

Figure 2B:
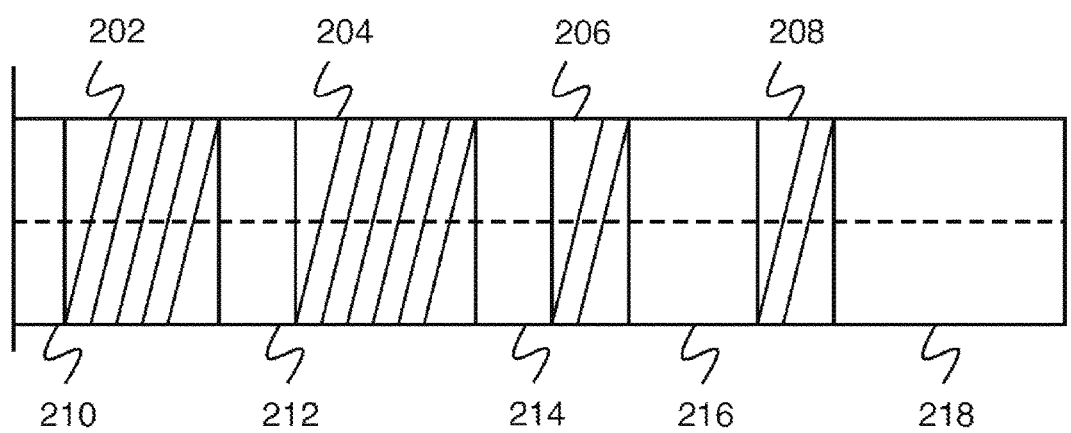
FIG. 2B is a diagram illustrating an embodiment of data regions.

FIG. 2B is a diagram illustrating an embodiment of data regions. In some embodiments, the data regions of FIG. 2B comprise data regions extracted from event recorder data 200 of FIG. 2A. In the example shown, the data regions of FIG. 2B comprise data event regions (e.g., data event region 202, data event region 204, data event region 206, and data event region 208) and data norm regions (e.g., data norm region 210, data norm region 212, data norm region 214, data norm region 216, and data norm region 218). In some embodiments, an event was detected in one or more of the detected data event regions (e.g., a measured deviation was larger than a threshold). In some embodiments, an event was not detected in one or more of the detected data event regions (e.g., no measured deviation was larger than a threshold). In some embodiments, in the event that it is desired to access continuous video recorder data corresponding to a region (e.g., continuous video data recorded at a time corresponding to a data event region or a sensor data norm region), an indication of the region is made (e.g., to an event data recorder) and the start time and end time of the region are used to access the continuous video data. In various embodiments, accessing the continuous video data comprises transmitting the continuous video data (e.g., to a vehicle data server), marking the continuous video data for later download (e.g., when the vehicle event recorder and the vehicle data server are in proximity), marking the continuous video data for preservation (e.g., such that the video will not be overwritten), or accessing the continuous video data in any other appropriate way.

Figure 3:
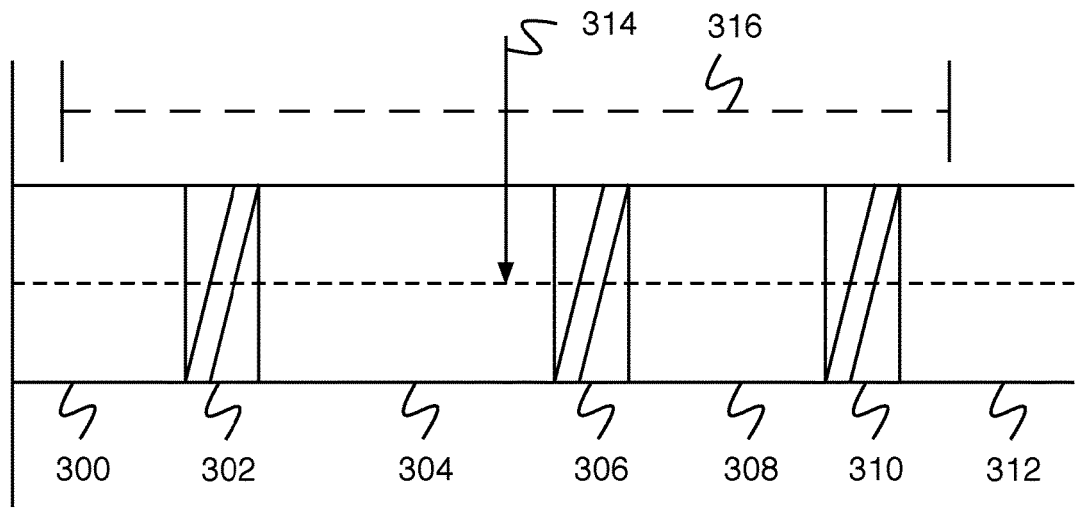
FIG. 3 is a diagram illustrating an embodiment of data regions.

FIG. 3 is a diagram illustrating an embodiment of data regions. In some embodiments, the data regions of FIG. 3 comprise data regions extracted from sensor data. In the example shown, the data regions of FIG. 3 comprise data event regions (e.g., data event region 302, data event region 306, and data event region 310) and data norm regions (e.g., data norm region 300, data norm region 304, data norm region 308, and data norm region 312). In some embodiments, the data region diagram of FIG. 3 is not to scale (e.g., the relative durations of the data event regions and the data norm regions is not accurately represented). In various embodiments, the duration of the data event regions (e.g., data event region 302, data event region 306, and data event region 310) comprises milliseconds, seconds, minutes, or any other appropriate time duration. In various embodiments, the duration of the data norm regions (e.g., data norm region 300, data norm region 304, data norm region 308, and data norm region 312) comprises milliseconds, seconds, minutes, hours, or any other appropriate time duration. Target time 314 comprises a target time for identifying an event. In some embodiments, a target time comprises a requested time for video from a continuous video recorder. In various embodiments, a target time comprises a time provided by a driver, a passenger, an administrator, an observer, or any other appropriate party. In some embodiments, a target time comprises an approximate time (e.g., an observer's best recollection of the time of an event). In some embodiments, a target time comprises a time of interest (e.g., a time at which it is determined that an event of interest has occurred, a time at which it is desired to review video, etc.). In some embodiments, target time range 316 comprises a time range describing a possible time of an event. In some embodiments, target time 314 and target time range 316 comprise an indication of an event of interest. In some embodiments, an indication of an event of interest comprises a target time, and a target time range is automatically determined (e.g., a default target time range is used, a target time range is determined from an event density, a target time range is determined based on user or organization history, etc.). In some embodiments, a vehicle event recorder provides a start mark and an end mark in response to an indication of an event of interest. In some embodiments, a start mark and an end mark are determined based at least in part on a target time, a target time range, a set of data event regions, and a set of data norm regions. In various embodiments, a start mark and an end mark are determined to enclose a nearest data event region (e.g., data event region 306), an opposite side nearest data event region (e.g., data event region 302), a data event region plus a buffer region (e.g., data event region 306 plus 10 seconds before, 45 seconds after, etc.), the two nearest data event regions (e.g., from the start of data event region 302 through the end of data event region 306), all data event regions enclosed within the target time range (e.g., from the start of data event region 302 through the end of data event region 310), or any other appropriate time period. In some embodiments, a user is provided with a list of regions to choose from. In some embodiments, a user reviews video corresponding to the possible regions in turn until satisfied.

In some embodiments, the start mark and the end mark are determined to enclose one or more data event regions. In some embodiments, the start mark and the end mark are determined to enclose one or more data event regions plus a buffer region before and after the one or more data event regions.

Figure 4:
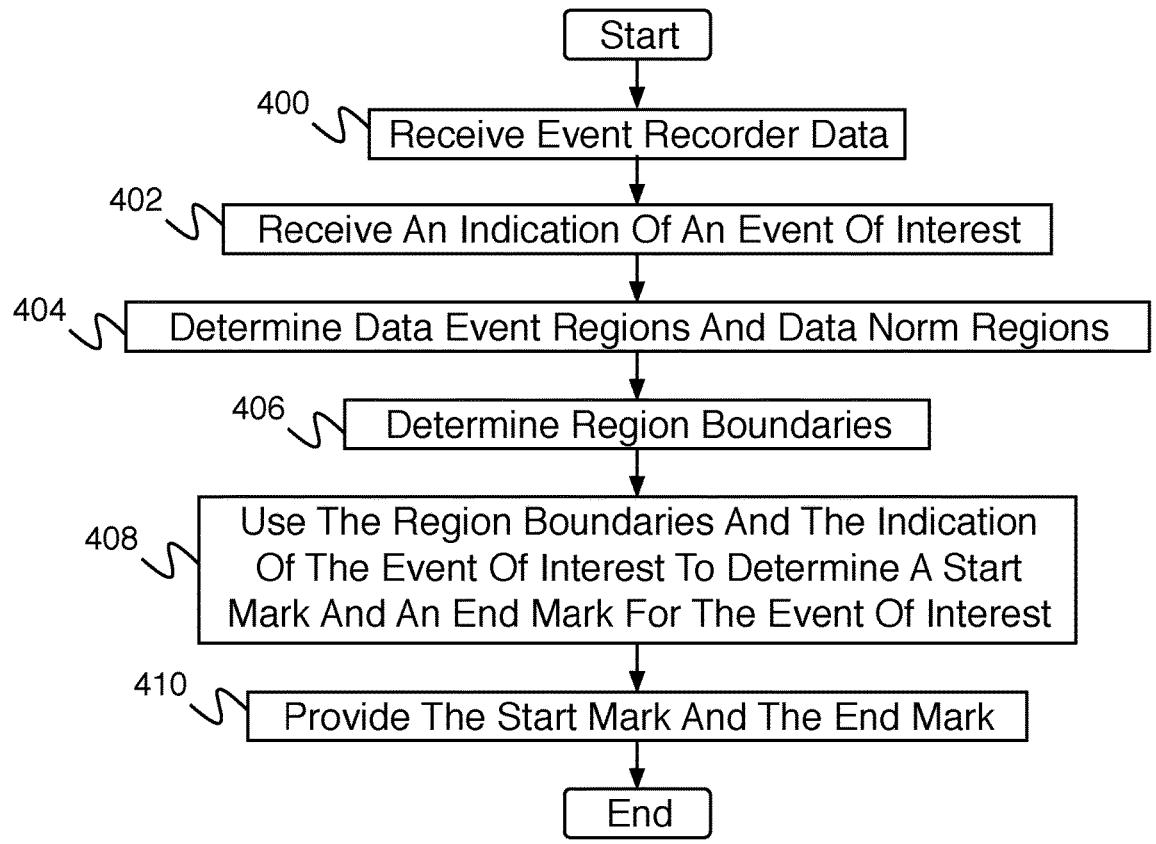
FIG. 4 is a flow diagram illustrating an embodiment of a process for marking video.

FIG. 4 is a flow diagram illustrating an embodiment of a process for marking video. In some embodiments, the process of FIG. 4 is used by a computing system (e.g., vehicle data server 104 of FIG. 1, vehicle event recorder 102 of FIG. 1, etc.) for marking video. In the example shown, in 400, event recorder data is received. In various embodiments, event recorder data comprises data from a video recorder (e.g., motion data extracted from video), data from an audio recorder (e.g., audio envelope data), event data, sensor data, accelerometer data, gyroscope data, data from GPS, accelerator data, braking data, engine data, temperature data, moisture data, line tracker data, driving maneuver data (e.g., driving maneuvers determined from a set of sensor data events, e.g., accelerometer data received over a period of time), or any other appropriate data. In some embodiments, multiple event recorder data streams are used (e.g., data from multiple sensors, audio data and video data, etc.). In 402, an indication of an event of interest is received. In some embodiments, an indication of an event of interest comprises a target time. In some embodiments, an indication of an event of interest comprises a target time range. In 404 data event regions and data norm regions are determined. In some embodiments, data norm regions comprise regions of time where the event recorder data comprises only background noise (e.g., the normal background behavior of the event recorder data). In some embodiments, data event regions comprise regions of time where the event recorder data comprises data distinguishable from background noise. In various embodiments, data event regions are determined using a data threshold, a filter, data event pattern recognition, or any other appropriate data processing technique. In some embodiments, data event regions are determined using a more sensitive process than is used by the vehicle event recorder to determine events (e.g., events represent large deviations e.g., a vehicle crash; data event regions represent any measured deviations). In 406 region boundaries are determined. Region boundaries comprise start and end time points of data event regions. In 408, the region boundaries and the indication of the event of interest are used to determine a start mark and an end mark for the event of interest. In various embodiments, the region boundaries and the indication of the event of interest are used to determine a start mark and an end mark for the event of interest by determining the data event region closest to the target time, by determining a region including all data event regions within the target time range, by determining a region including the two data event regions closest to the target time, or using any other appropriate method. In 410, the start mark and the end mark are provided (e.g., to a continuous video recorder). In various embodiments, the start mark and end mark are used to trigger a download of video, to mark video to not be overwritten, to trigger a video copy to a data storage device for collecting video segments, or to preserve video in any other appropriate way. In some embodiments, the processor of the system (e.g., the event data system) is configured to transfer video data from the continuous video recorder from the start mark to the end mark. For example, the processor indicates to the continuous video recorder to locate the video data, transfer the video data from its stored location to an interface (e.g., a wired or wireless transmitter or cellular system interface) to a remote server location.

Figure 5:
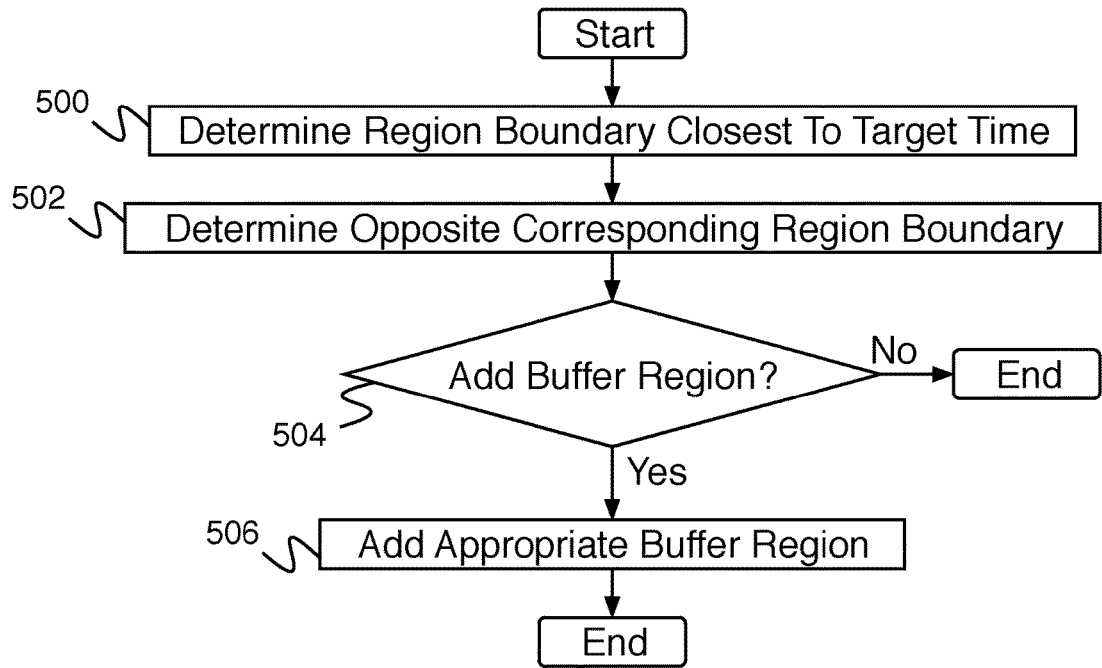
FIG. 5 is a flow diagram illustrating an embodiment of a process for using region boundaries and an indication of an event of interest to determine a start mark and an end mark for an event of interest by determining the data event region closest to the target time.

FIG. 5 is a flow diagram illustrating an embodiment of a process for using region boundaries and an indication of an event of interest to determine a start mark and an end mark for an event of interest by determining the data event region closest to the target time. In some embodiments, the process of FIG. 5 implements 408 of FIG. 4. In the example shown, in 500, the region boundary closest to the target time is determined. In 502, the opposite corresponding region boundary is determined (e.g., if the region boundary determined in 500 comprises a data event region start time, the region boundary determined in 502 comprises the corresponding data event region end time). The determined region boundaries comprise a determined start mark and end mark. In 504, it is determined whether to add a buffer region to the determined region of the event of interest. In the event it is determined not to add a buffer region, the process ends. In the event it is determined to add a buffer region in 504, control passes to 506. In 506, an appropriate buffer region is added. In various embodiments, adding an appropriate buffer region comprises moving a start time to an earlier time by a buffer region size, moving an end time to a later time by a buffer region size, moving both a start time and an end time, or changing the start and end times in any other appropriate way. In various embodiments, a buffer region size comprises 1 millisecond, 10 milliseconds, 1 second, 1 minute, 10 minutes, or any other appropriate amount of time.

Figure 6:
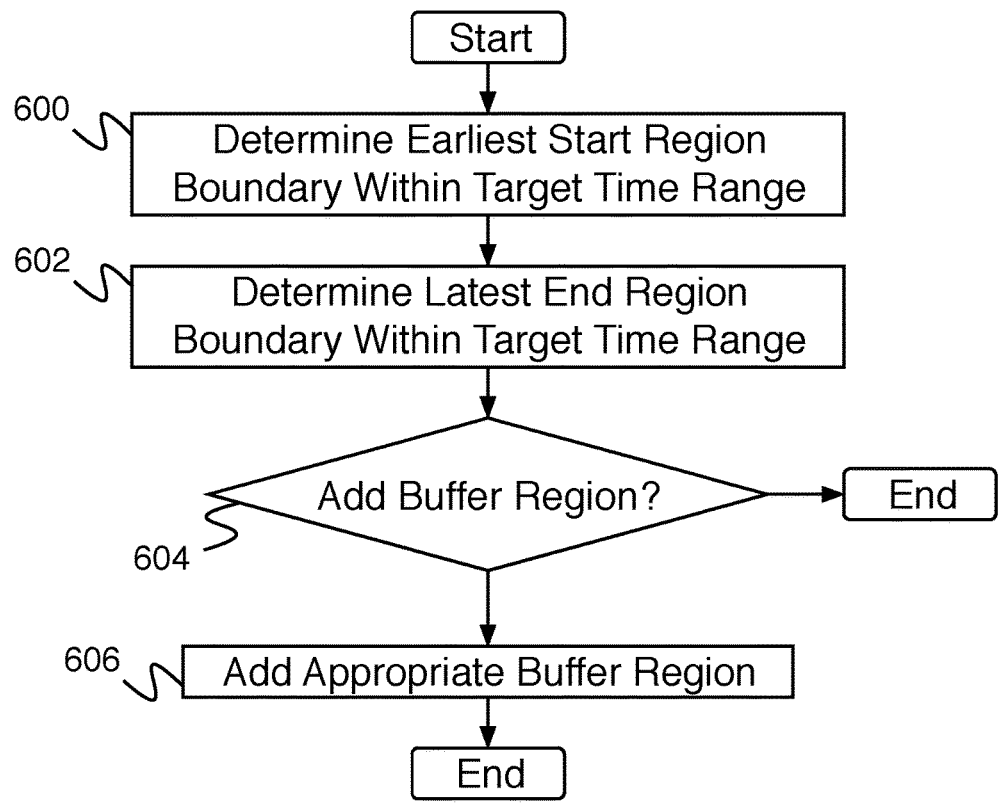
FIG. 6 is a flow diagram illustrating an embodiment of a process for using region boundaries and an indication of an event of interest to determine a start mark and an end mark for an event of interest by determining a region including all data event regions within the target time range.

FIG. 6 is a flow diagram illustrating an embodiment of a process for using region boundaries and an indication of an event of interest to determine a start mark and an end mark for an event of interest by determining a region including all data event regions within the target time range. In some embodiments, the process of FIG. 6 implements 408 of FIG. 4. In the example shown, in 600, the earliest start region boundary within the target time range is determined. In 602, the latest end region boundary within the target time range is determined. The determined region boundaries comprise a determined start mark and end mark. In 604, it is determined whether to add a buffer region to the determined region of the event of interest. In the event it is determined not to add a buffer region, the process ends. In the event it is determined to add a buffer region in 604, control passes to 606. In 606, an appropriate buffer region is added. In various embodiments, adding an appropriate buffer region comprises moving a start time to an earlier time by a buffer region size, moving an end time to a later time by a buffer region size, moving both a start time and an end time, or changing the start and end times in any other appropriate way. In various embodiments, a buffer region size comprises 1 millisecond, 10 milliseconds, 1 second, 1 minute, 10 minutes, or any other appropriate amount of time.

Figure 7:
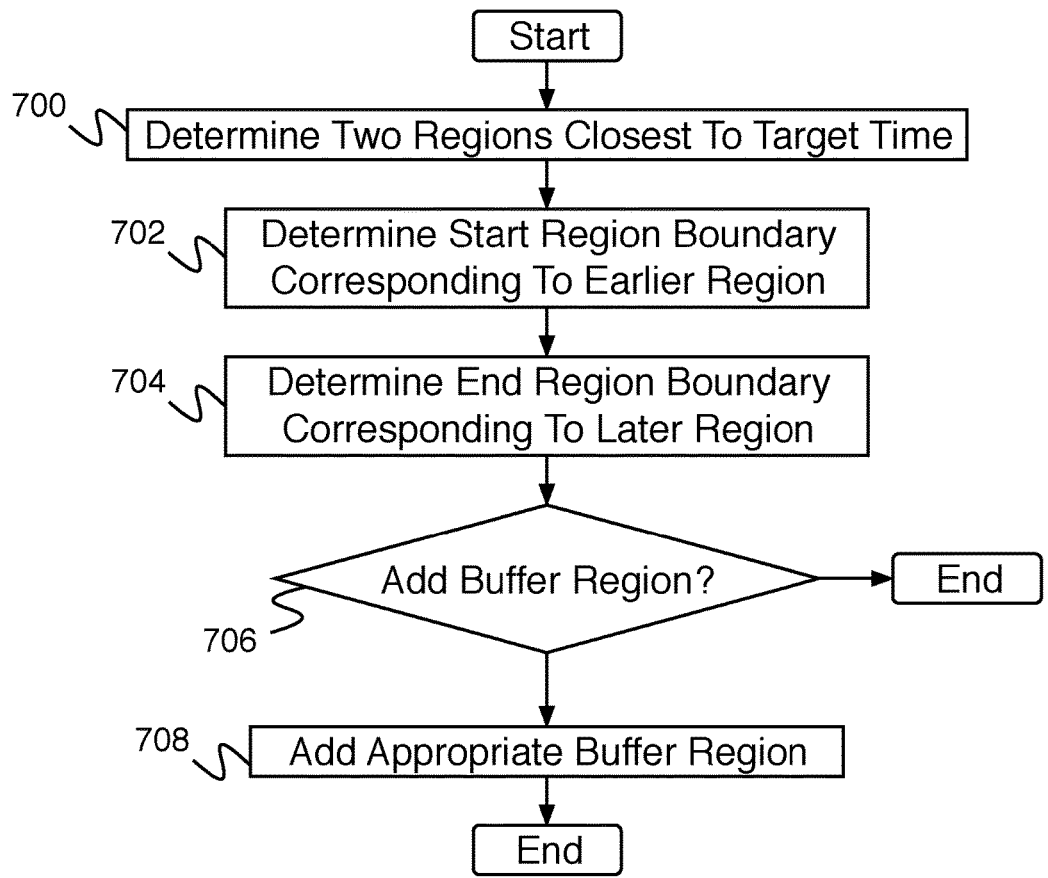
FIG. 7 is a flow diagram illustrating an embodiment of a process for using region boundaries and an indication of an event of interest to determine a start mark and an end mark for an event of interest by determining a region including the two data event regions closest to the target time, or using any other appropriate method.

FIG. 7 is a flow diagram illustrating an embodiment of a process for using region boundaries and an indication of an event of interest to determine a start mark and an end mark for an event of interest by determining a region including the two data event regions closest to the target time, or using any other appropriate method. In some embodiments, the process of FIG. 7 implements 408 of FIG. 4. In the example shown, in 700, the two regions closest to the target time are determined. In some embodiments, the two regions closest to the target time are determined by determining the two closest region boundaries (e.g., the two region boundaries that are closest to the target time and not associated with one another, e.g., not a start and end boundary of the same data event region), and determining the region boundaries associated with each of the two closest region boundaries. In 702, the start region boundary corresponding to the earlier region (e.g., the earlier region of the two regions determined in 700) is determined. In 704, the end region boundary corresponding to the later region (e.g., the later region of the two regions determined in 700) is determined. The determined region boundaries comprise a determined start mark and end mark. In 706, it is determined whether to add a buffer region to the determined region of the event of interest. In the event it is determined not to add a buffer region, the process ends. In the event it is determined to add a buffer region in 706, control passes to 708. In 708, an appropriate buffer region is added. In various embodiments, adding an appropriate buffer region comprises moving a start time to an earlier time by a buffer region size, moving an end time to a later time by a buffer region size, moving both a start time and an end time, or changing the start and end times in any other appropriate way. In various embodiments, a buffer region size comprises 1 millisecond, 10 milliseconds, 1 second, 1 minute, 10 minutes, or any other appropriate amount of time.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for marking video, comprising:
an input interface configured to:
receive event recorder data from an event data recorder; and
receive an indication of an event of interest, wherein the event of interest is indicated using a target time, a target time range, or both;
a processor configured to:
determine a start mark and an end mark associated with a vehicle for the event of interest based at least in part on the indication and a set of data event regions in the event recorder data and a set of data norm regions in the event recorder data, wherein region boundaries include start and end time points of data event regions, wherein the determining of the start mark and the end mark comprises to:
perform one or more of the following:
A) determine a region boundary closest to the target time to obtain the start mark; and
determine an opposite region boundary closest to the target time to obtain the end mark;
B) determine an earliest start region boundary within the target time range to obtain the start mark; and
determine a latest start region boundary within the target time range to obtain the end mark; or
C) determine two data event regions closest to the target time;
determine that an earlier of the two data event regions corresponds to the start mark; and
determine that a later of the two data event regions corresponds to the end mark; and
an output interface configured to:
provide the start mark and the end mark to a continuous video recorder of the vehicle.

2. The system as in claim 1, wherein the event data recorder and the continuous video recorder are separate units.

3. The system as in claim 1, wherein the event data recorder and the continuous video recorder are the same unit.

4. The system as in claim 1, wherein the target time comprises an approximate time of the event of interest.

5. The system as in claim 1, wherein the target time range comprises a range of times within which a user indicates the event of interest took place.

6. The system of claim 1, wherein the event recorder data comprises one or more of the following: event data, video data, audio data, sensor data, or driving maneuvers.

7. The system of claim 1, wherein an event of interest comprises one or more of the following: an event recorder event, a driving maneuver, or a client indication.

8. The system of claim 1, wherein the start mark and the end mark are determined to enclose one or more data event regions.

9. The system of claim 8, wherein the start mark and the end mark are determined to enclose one or more data event regions plus a buffer region before and after the one or more data event regions.

10. The system of claim 1, wherein the processor is configured to transfer a video data from the continuous video recorder as indicated by the start mark and the end mark.

11. A method for marking video, comprising:
receiving event recorder data from an event data recorder; and
receiving an indication of an event of interest, wherein the event of interest is indicated using a target time, a target time range, or both;
determining, using a processor, a start mark and an end mark associated with a vehicle for the event of interest based at least in part on the indication, a set of data event regions in the event recorder data and a set of data norm regions in the event recorder data, wherein region boundaries include start and end time points of data event regions, wherein the determining of the start mark and the end mark comprises:
performing one or more of the following:
A) determining a region boundary closest to the target time to obtain the start mark; and
determining an opposite region boundary closest to the target time to obtain the end mark;
B) determining an earliest start region boundary within the target time range to obtain the start mark; and
determining a latest start region boundary within the target time range to obtain the end mark; or
C) determining two data event regions closest to the target time;
determining that an earlier of the two data event regions corresponds to the start mark; and
determining that a later of the two data event regions corresponds to the end mark; and
providing the start mark and the end mark to a continuous video recorder of the vehicle.

12. The method as in claim 11, wherein the event data recorder and the continuous video recorder are separate units.

13. The method as in claim 11, wherein the event data recorder and the continuous video recorder are the same unit.

14. The method as in claim 11, wherein the target time comprises an approximate time of the event of interest.

15. The method as in claim 11, wherein the target time range comprises a range of times within which a user indicates the event of interest took place.

16. The method of claim 11, wherein the event recorder data comprises one or more of the following: event data, video data, audio data, sensor data, or driving maneuvers.

17. The method of claim 11, wherein an event of interest comprises one or more of the following: an event recorder event, a driving maneuver, or a client indication.

18. A computer program product for marking video, the computer program product being embodied in a non-transitory computer readable storage medium and comprising computer instructions for:
receiving event recorder data from an event data recorder; and
receiving an indication of an event of interest, wherein the event of interest is indicated using a target time, a target time range, or both;
determining, using a processor, a start mark and an end mark associated with a vehicle for the event of interest based at least in part on the indication, a set of data event regions in the event recorder data and a set of data norm regions in the event recorder data, wherein region boundaries include start and end time points of data event regions, wherein the determining of the start mark and the end mark comprises:

performing one or more of the following:
A) determining a region boundary closest to the target time to obtain the start mark; and
   determining an opposite region boundary closest to the target time to obtain the end mark;
B) determining an earliest start region boundary within the target time range to obtain the start mark; and
   determining a latest start region boundary within the target time range to obtain the end mark; or
C) determining two data event regions closest to the target time;
   determining that an earlier of the two data event regions corresponds to the start mark; and
   determining that a later of the two data event regions corresponds to the end mark; and
providing the start mark and the end mark to a continuous video recorder of the vehicle.

* * * * *